(12) United States Patent
Iimori et al.

(10) Patent No.: US 10,288,421 B2
(45) Date of Patent: May 14, 2019

(54) ELECTRICAL WIRE LENGTH OUTPUT METHOD AND STORAGE MEDIUM IN WHICH ELECTRICAL WIRE LENGTH OUTPUT PROGRAM IS STORED

(71) Applicant: Yazaki Corporation, Tokyo (JP)

(72) Inventors: Yasuo Iimori, Kosai (JP); Yasuhiro Mochizuki, Kosai (JP); Takao Kanai, Kosai (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 941 days.

(21) Appl. No.: 14/321,959

(22) Filed: Jul. 2, 2014

(65) Prior Publication Data

US 2014/0316741 A1 Oct. 23, 2014

Related U.S. Application Data

(63) Continuation of application No. PCT/JP2013/050845, filed on Jan. 17, 2013.

(30) Foreign Application Priority Data

Jan. 19, 2012 (JP) ................................ 2012-009358

(51) Int. Cl.
*G01B 21/02* (2006.01)
*G06F 17/50* (2006.01)

(52) U.S. Cl.
CPC ............ *G01B 21/02* (2013.01); *G06F 17/50* (2013.01); *G06F 17/509* (2013.01); *G06F 2217/36* (2013.01)

(58) Field of Classification Search
CPC ....... G01B 21/02; G06F 17/50; G06F 17/509; G06F 2217/36
See application file for complete search history.

(56) References Cited

U.S. PATENT DOCUMENTS

| 5,680,330 | A | 10/1997 | Kunimi et al. |
| 6,330,746 | B1 | 12/2001 | Uchiyama et al. |
| 2003/0020711 | A1 | 1/2003 | Sakakura et al. |
| 2003/0020715 | A1 | 1/2003 | Sakakura et al. |
| 2003/0023947 | A1 | 1/2003 | Sakakura et al. |
| 2009/0063114 | A1 | 3/2009 | Demizu et al. |
| 2011/0153280 | A1 | 6/2011 | Yamada et al. |

(Continued)

FOREIGN PATENT DOCUMENTS

| EP | 0967122 A2 | 12/1999 |
| JP | 8-180747 A | 7/1996 |
| JP | 2003-132102 A | 5/2003 |

(Continued)

OTHER PUBLICATIONS

Office Action dated Sep. 9, 2015, issued by the Korean Patent Office in counterpart Korean Application No. 10-2014-7020262.

(Continued)

*Primary Examiner* — Janet L Suglo
(74) *Attorney, Agent, or Firm* — Sughrue Mion, PLLC

(57) ABSTRACT

An electrical wire length output method according to the present invention sets a first cavity reference cross section, a first node reference cross section, and a second node reference cross section, and a second cavity reference cross section, calculates a section wire length in each section of the reference cross sections, and outputs the sum of the section wire lengths as the wire length of an electrical wire.

4 Claims, 9 Drawing Sheets

(56) References Cited

U.S. PATENT DOCUMENTS

2013/0144418 A1   6/2013  Tsuchiya et al.

FOREIGN PATENT DOCUMENTS

| JP | 2009-76033 A  | 4/2009 |
|----|---------------|--------|
| JP | 2009-181746 A | 8/2009 |
| JP | 2009-205402 A | 9/2009 |
| JP | 2010-49591 A  | 3/2010 |
| JP | 2011-150498 A | 8/2011 |

OTHER PUBLICATIONS

Office Action dated Nov. 4, 2015, issued by the Japanese Intellectual Property Office in counterpart Japanese Application No. 2012-009358.
Office Action dated Nov. 30, 2015, issued by the European Patent Office in counterpart European Patent Application No. 13739013.4.
International Preliminary Report on Patentability for PCT/JP2013/050845, dated Jul. 22, 2014.
International Search Report dated Mar. 19, 2013 issued in International Application No. PCT/JP2013/050845 (PCT/ISA/210).
Written Opinion dated Mar. 19, 2013 issued in International Application No. PCT/JP2013/050845 (PCT/ISA/237).
Amane Takei et al., "A fundamental study of simulation for wire-harnesses using interatomic potential", May 12, 2011, 7 pgs. total.

ELECTRICAL WIRE LENGTH OUTPUT METHOD AND STORAGE MEDIUM IN WHICH ELECTRICAL WIRE LENGTH OUTPUT PROGRAM IS STORED

CROSS REFERENCE TO RELATED APPLICATIONS

This application is a continuation of international application No. PCT/JP2013/050845 filed on Jan. 17, 2013 claiming the benefit of Japanese Patent Application No. 2012-009358 filed on Jan. 19, 2012, the contents of which are incorporated herein by reference in its entirety.

BACKGROUND OF THE INVENTION

1. Field of the Invention

The present invention relates to an electrical wire length output method and an electrical wire length output program that are used to determine the electrical wire length of each electrical wire that forms a wire harness.

2. Description of the Related Art

Before manufacturing an actual wire harness, a virtual wire harness is modeled by a computer, and studies are made in the design stage of the virtual wire harness. Examples of this type of simulation are disclosed in JP-A-8-180747, JP-A-2003-132102, JP-A-2009-181746 and JP-A-2010-49591.

SUMMARY OF THE INVENTION

In order to model the wire harness, it is necessary to determine the length of each electrical wire (hereinafter, simply referred to as an electrical wire length) that forms the wire harness. Incidentally, in recent years, in order to improve the efficiency of the work for arranging electrical wires over the jig plate in the wire harness manufacturing process, a wire harness in which electrical wires are arranged over the jig plate is modeled in the wire harness design stage (refer to JP-A-2003-132102). When modeling such a wire harness, for example, the following problems may occur if an appropriate value is not set as the electrical wire length.

That is, if the electrical wire length is set to be smaller than the ideal value, modeling is performed in a state where a connector connected to one end of an electrical wire does not reach a connector fixture disposed over the jig plate and accordingly the electrical wire cannot be appropriately arranged or it is in a state where excessive tension is applied to the electrical wire even if the connector reaches the connector fixture so that the electrical wire can be arranged. On the other hand, if the electrical wire length is set to be larger than the ideal value, excessive curvature is formed on the arranged wire. In this case, modeling is performed in a state where other electrical wires are entangled with the curved portion.

Whether or not an appropriate value is set as the electrical wire length is determined by the analyst who views the wire harness modeled in a state of being arranged over the jig plate. When the analyst determines that an appropriate value is not set as the electrical wire length, the analyst sets a value for the electrical wire length again to model the wire harness. In order to reduce the time and effort required to set the electrical wire length, a method capable of calculating the electrical wire length before modeling is required.

It is an object of the present invention to provide an electrical wire length output method and an electrical wire length output program capable of calculating the electrical wire length of each electrical wire that forms a wire harness before modeling the wire harness arranged over the jig plate.

Aspects of the present invention provides an electrical wire length output method which has any of the following features (1) to (3).

(1) An electrical wire length output method for calculating a wire length of each electrical wire using an analyzer, wherein the electrical wire arranged over a jig plate includes one end connected to a first connector and the other end connected to a second connector, the electrical wire length output method including:

an input step of receiving an input of information for specifying at least a first cavity reference cross section that is a plane including the one end of the electrical wire connected to the first connector, a second cavity reference cross section that is a plane including the other end of the electrical wire connected to the second connector, a first node reference cross section that is a plane, in parallel to the first cavity reference cross section, located to be separated by a predetermined distance toward the first cavity reference cross section from a bending point where the electrical wire is bent, and a second node reference cross section that is a plane, in parallel to the second cavity reference cross section, located to be separated by the predetermined distance toward the second cavity reference cross section from the bending point;

a passing point calculation step of calculating a passing point where the electrical wire passes through each cross section of the first cavity reference cross section, the first node reference cross section, the second node reference cross section, and the second cavity reference cross section;

a section wire length calculation step of calculating a section wire length in a section from the first cavity reference cross section to the first node reference cross section based on position coordinates of a first passing point where the electrical wire passes through the first cavity reference cross section and position coordinates of a second passing point where the electrical wire passes through the first node reference cross section, calculating a section wire length in a section from the first node reference cross section to the second node reference cross section based on the position coordinates of the second passing point where the electrical wire passes through the first node reference cross section, position coordinates of a third passing point where the electrical wire passes through the second node reference cross section and a bending angle of the electrical wire at the bending point, and calculating a section wire length in a section from the second node reference cross section to the second cavity reference cross section based on the position coordinates of the third passing point where the electrical wire passes through the second node reference cross section and position coordinates of a fourth passing point where the electrical wire passes through the second cavity reference cross section; and an output step of outputting, as the wire length of the electrical wire, a sum of the section wire lengths in the respective sections calculated in the section wire length calculation step.

(2) The electrical wire length output method according to the configuration of the above (1), wherein the input step further receives an input of information for specifying a first segment reference cross section, which is located between the first cavity reference cross section and the first node reference cross section in parallel to the first cavity reference cross section and the first node reference cross section, and a second segment reference cross section, which is located between the second cavity reference cross section and the second node reference cross section in parallel to the second cavity reference cross section and the section node reference cross section, wherein a density of a fifth passing point passing through the first segment reference cross section occupied per unit area is larger than a density of the first passing point passing through the first segment reference cross section occupied per unit area and a density of a sixth passing point passing through the second segment reference cross section occupied per unit area is larger than a density of the fourth passing point passing through the second segment reference cross section occupied per unit area, the passing point calculation step further calculates a passing point where the electrical wire passes through each cross section of the first and second segment reference cross sections, and the section wire length calculation step further calculates a section wire length in a section from the first cavity reference cross section to the first segment reference cross section based on the position coordinates of the first passing point and position coordinates of the fifth passing point, calculates a section wire length in a section from the first segment reference cross section to the first node reference cross section based on the position coordinates of the fifth passing point and the position coordinates of the second passing point, calculates a section wire length in a section from the second node reference cross section to the second segment reference cross section based on the position coordinates of the third passing point and position coordinates of the sixth passing point, and calculates a section wire length in a section from the second segment reference cross section to the second cavity reference cross section based on the position coordinates of the sixth passing point and the position coordinates of the fourth passing point.

(3) The electrical wire length output method according to the configuration of the above (2), wherein the passing point calculation step calculates the second passing point or the fifth passing point by projecting a reduction of a distribution of the first passing point on the first cavity reference cross section onto the first node reference cross section or the first segment reference cross section, and calculates the third passing point or the sixth passing point by projecting a reduction of a distribution of the fourth passing point on the second cavity reference cross section onto the second node reference cross section or the second segment reference cross section.

An aspect of the present invention provides a storage medium which has the following feature (4).

(4) A non-transitory computer-readable storage medium in which an electrical wire length output program is stored for causing a computer to execute each step of the electrical wire length output method according to any one of the configurations of the above (1) to (3).

According to the electrical wire length output method of the configuration of the above (1), it is possible to calculate the electrical wire length of each electrical wire that forms a wire harness before modeling the wire harness arranged over the jig plate.

According to the electrical wire length output method of the configuration of the above (2), the electrical wire length of each electrical wire that forms a wire harness can be calculated more accurately according to the shape of an actual wire harness.

According to the electrical wire length output method of the configuration of the above (3), the electrical wire length of each electrical wire that forms a wire harness can be calculated more accurately according to the shape of an actual wire harness.

According to the electrical wire length output program of the configuration of the above (4), it is possible to calculate the electrical wire length of each electrical wire that forms a wire harness before modeling the wire harness arranged over the jig plate.

According to the electrical wire length output method and the electrical wire length output program, it is possible to calculate the electrical wire length of each electrical wire that forms a wire harness before modeling the wire harness arranged over the jig plate. As a result, since the appropriate electrical wire length that is calculated is set as the electrical wire length of the modeled electrical wire, it is possible to reduce the time and effort required for the analyst to set a value for the electrical wire length again for recalculation when the analyst determines that an appropriate value is not set as the electrical wire length.

Aspects of the present invention have been briefly described above. The details of the present invention will be further clarified by Description of Embodiments (hereinafter, referred to as "embodiments"), which will be described below, with reference to the accompanying diagrams.

BRIEF DESCRIPTION OF THE DRAWINGS

FIG. 1A is a diagram showing a state in which the interatomic force potential does not act and FIG. 1B is a diagram showing a state in which the interatomic force potential acts.

FIG. 2A is a diagram showing a case where the attractive force acts between atoms and FIG. 2B is a diagram showing a case where the repulsive force acts between atoms.

FIG. 5A is a diagram obtained by dispersing the nodes of various electrical wires in the width direction of a U fork and FIG. 5B is a diagram obtained by dispersing the nodes of various electrical wires in the height direction of the U fork.

FIG. 6A is a diagram when the jig plate is viewed from above and FIG. 6B is a cross-sectional view taken along the line VIb-VIb in FIG. 6A.

FIG. 9A is a perspective view when viewed from above the first cavity reference cross section and the first segment reference cross section and FIG. 9B is a side view when the perspective view of FIG. 9A is viewed from the side.

DETAILED DESCRIPTION OF THE EXEMPLARY EMBODIMENTS

Hereinafter, an electrical wire length output method using a wire harness analyzer of an embodiment of the present invention will be described in detail.

[Wire Harness Simulation Method in which Stress Between Electrical Wires is Taken into Consideration]

Before describing the embodiment of the present invention, an example of a wire harness simulation method in which stress between electrical wires is taken into consideration will be described first.

Figure 1A:
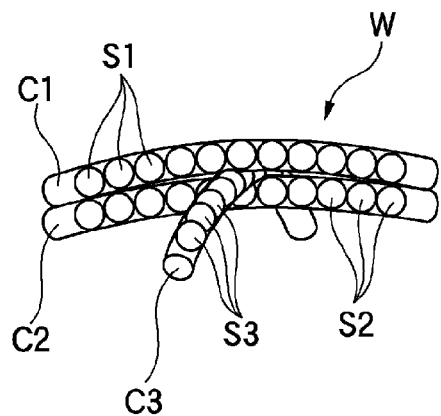
FIGS. 1A and 1B are image diagrams of a wire harness modeled using the interatomic force potential, where
Figure 1B:
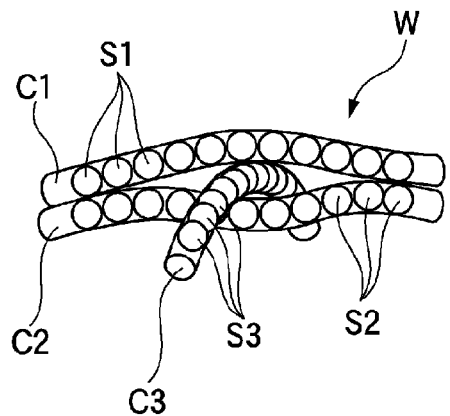
Figure 2A:
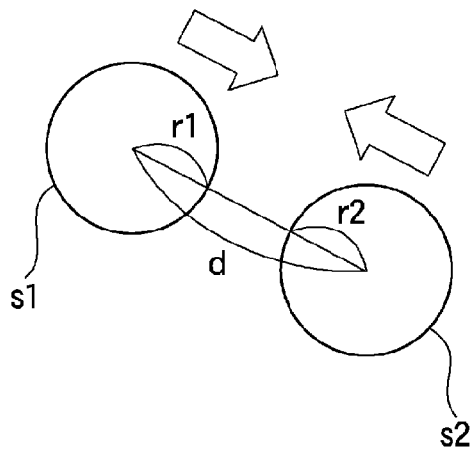
FIGS. 2A and 2B are diagrams for explaining the interatomic interaction, where
Figure 2B:
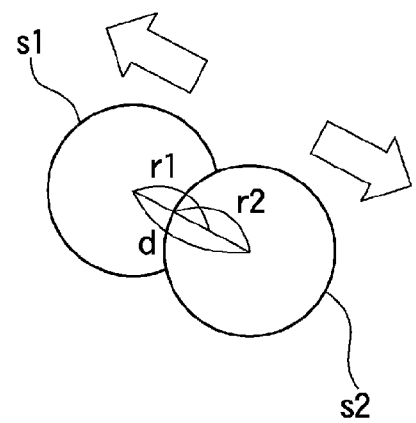

As an algorithm in which stress acting between electrical wires that form a wire harness is taken into consideration, a fundamental study has been made in "A fundamental study of simulation for wire-harnesses using interatomic potential: TAKEI Amane, MATSUSHIMA Motoi, KOMIYA Shigeru, YAMAMOTO Ichiro, The Japan Society of Mechanical Engineers, The Computational Mechanics Conference, Journal". In this non-patent literature, in wire harness design using CAD, as a method for avoiding the penetration between wires in which the rigidity of the wire is taken into consideration, a mathematical model for avoiding the penetration between wires by newly considering the interatomic force potential for the dynamic model proposed so far and the calculation algorithm have been proposed. An overview of the calculation algorithm will be described below. In this specification, when modeling a virtual wire harness, being positioned as if an electrical wire is embedded into an object in a state where contact between the electrical wire and the object other than the electrical wire is not taken into consideration is referred to as "penetrate". FIGS. 1A and 1B are image diagrams of a wire harness modeled using the interatomic force potential. FIG. 1A is a diagram showing a state in which the interatomic force potential does not act, and FIG. 1B is a diagram showing a state in which the interatomic force potential acts. FIGS. 2A and 2B are diagrams for explaining the interatomic interaction. FIG. 2A is a diagram showing a case where the attractive force acts between atoms, and FIG. 2B is a diagram showing a case where the repulsive force acts between atoms. For the details of the calculation algorithm, the above-described non-patent literature can be referred to.

As shown in FIGS. 1A and 1B, a plurality of electrical wires C1, C2, and C3 that form a wire harness W/H are modeled such that a number of spherical atoms for potential evaluation S1, S2, and S3 are disposed adjacent to each other. In order to model the electrical wire C1, C2, and C3 so that the wire diameter in a longitudinal direction is fixed, radii R1, R2, and R3 of the atoms for potential evaluation S1, S2, and S3 that form the electrical wires C1, C2, and C3 are fixed values.

As shown in FIG. 2A, in two atoms for potential evaluation s1 and s2, if a distance d between the centers of the atoms for potential evaluation s1 and s2 is larger than the sum of the radius r1 of the atom for potential evaluation s1 and the radius r2 of the atom for potential evaluation s2, attractive force acts between the two atoms for potential evaluation s1 and s2. On the other hand, as shown in FIG. 2B, in the two atoms for potential evaluation s1 and s2, if the distance d between the centers of the atoms for potential evaluation s1 and s2 is smaller than the sum of the radius r1 of the atom for potential evaluation s1 and the radius r2 of the atom for potential evaluation s2, repulsive force acts between the two atoms for potential evaluation s1 and s2. In FIGS. 2A and 2B, the interatomic force potential that acts between the two atoms for potential evaluation s1 and s2 has been described. However, the interatomic force potential acts between the respective atoms for potential evaluation S1, S2, and S3, which form the electrical wires C1, C2, and C3 described above, and all atoms for potential evaluation S1, S2, and S3 other than the corresponding atoms for potential evaluation S1, S2, and S3.

Therefore, a total value u of the interatomic force potential is calculated that acts between the respective atoms for potential evaluation S1, S2, and S3 and all atoms for potential evaluation S1, S2, and S3 other than the corresponding atoms for potential evaluation S1, S2, and S3. For the electrical wires C1, C2, and C3, sums U1, U2, and U3 of the total value u of the interatomic force potential of the atoms for potential evaluation S1, S2, and S3 that form the electrical wires C1, C2, and C3 are calculated respectively. U calculated in this manner indicates potential energy that one electrical wire has.

When the wire harness to be modeled is formed by N electrical wires C1, C2, . . . , CN, potential energy U1, U2, . . . , UN are calculated for the respective electrical wires C1, C2, . . . , CN. The potential energy U1, U2, . . . , UN calculated in this manner is repeatedly calculated using the coordinates (x, y, z) of the respective atoms for potential evaluation S1, S2, . . . , SN as design variables, and a design variable to minimize the potential energy U1, U2, . . . , UN is obtained. Design variables in certain electrical wires C1, C2, . . . , CN obtained in this manner, that is, the coordinates (x, y, z) of the atoms for potential evaluation S1, S2, . . . , SN indicate the coordinates of the electrical wire in a most stable state in terms of energy. In this manner, it is possible to obtain the wire harness for which stress between electrical wires is taken into consideration.

Incidentally, in the calculation algorithm described above, it can be considered that electrical wire lengths L0, L0, . . . , LN are imposed as constraints on the electrical wires C1, C2, . . . , CN when obtaining a design variable to minimize the potential energy U1, U2, . . . , UN. That is, a method for obtaining the coordinates (x, y, z) of the atoms for potential evaluation S1, S2, . . . , SN satisfying the following conditions (1) and (2) can be considered.

(1) Each potential energy U1, U2, . . . , UN is minimized.

(2) Error between the electrical wire length of each electrical wire calculated based on the coordinates (x, y, z) of the atoms for potential evaluation S1, S2, . . . , SN and each of the set electrical wire lengths L0, L0, . . . , LN falls within a predetermined range.

The condition of (2) can be said to be a constraint condition imposed under the background in which making the electrical wire length as short as possible is required for the actual wire harness.

As described in [Technical Problem], when modeling the wire harness arranged over the jig plate, the appropriate electrical wire lengths L0, L0, . . . , LN need to be set as electrical wire lengths. Incidentally, in the algorithm in which the stress acting between electrical wires described above is taken into consideration, it takes very long calculation time to model a wire harness, that is, to obtain a design variable to minimize the potential energy U1, U2, . . . , UN. For this reason, when the analyst determines that the appropriate values L0, L0, . . . , LN are not set as electrical wire lengths, if the wire harness is modeled by setting the values again as the electrical wire lengths, the time loss is immeasurable. In order to solve such a problem, the inventors of this application have found out a method capable of calculating the electrical wire length before modeling.

[Hardware Configuration of the Wire Harness Analyzer of the Embodiment of the Present Invention]

Figure 3:
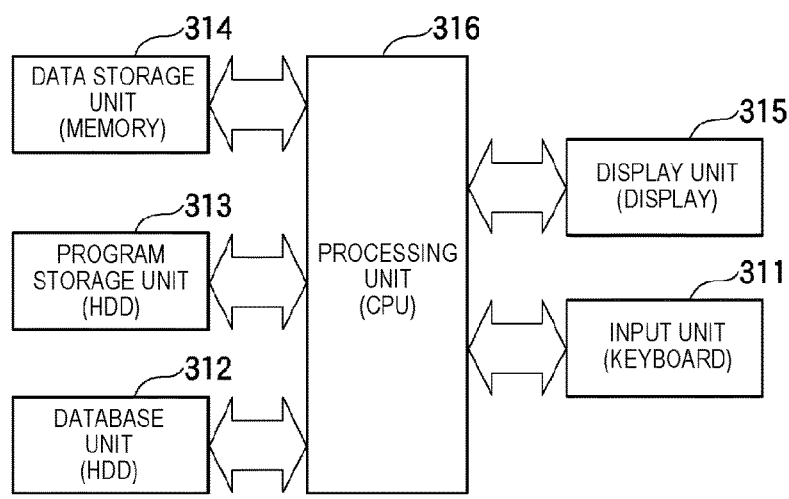
FIG. 3 is a block diagram showing the hardware configuration of a wire harness analyzer of an embodiment of the present invention.

FIG. 3 is a block diagram showing the hardware configuration of a wire harness analyzer according to the embodiment of the present invention. The wire harness analyzer according to the embodiment of the present invention is configured to include an input unit 311, a database unit 312, a program storage unit 313, a data storage unit 314, a display unit 315, and a processing unit 316. When the wire harness analyzer of the present invention is formed by, for example, a general-purpose PC, the input unit 311 is implemented by various input interfaces, such as a keyboard, a mouse, and a numeric keypad, the database unit 312 and the program storage unit 313 are implemented by a hard disk drive (HDD), the data storage unit 314 is implemented by a random access memory (RAM), the display unit 315 is implemented by various output devices, such as a CRT display and a liquid crystal display, and the processing unit 316 is implemented by a central processing unit (CPU). Electrical wire shape information, connector shape information, jig shape information, and the like that are used when modeling the wire harness are stored in the database unit 312. In addition, the calculation algorithm described in the above [Wire harness simulation method in which stress between the electrical wire and the fixture is taken into consideration] or a program causing the processing unit 316 to execute a process according to the electrical wire length output method of the embodiment of the present invention, which will be described later, is recorded in the program storage unit 313. In addition, the calculation algorithm described in the above [Wire harness simulation method in which stress between the electrical wire and the fixture is taken into consideration] or data input/output through the processing unit 316 that performs the process according to the electrical wire length output method of the embodiment, which will be described later, is recorded in the data storage unit 314.

[Overview of the Electrical Wire Length Calculation Method]

Figure 4:
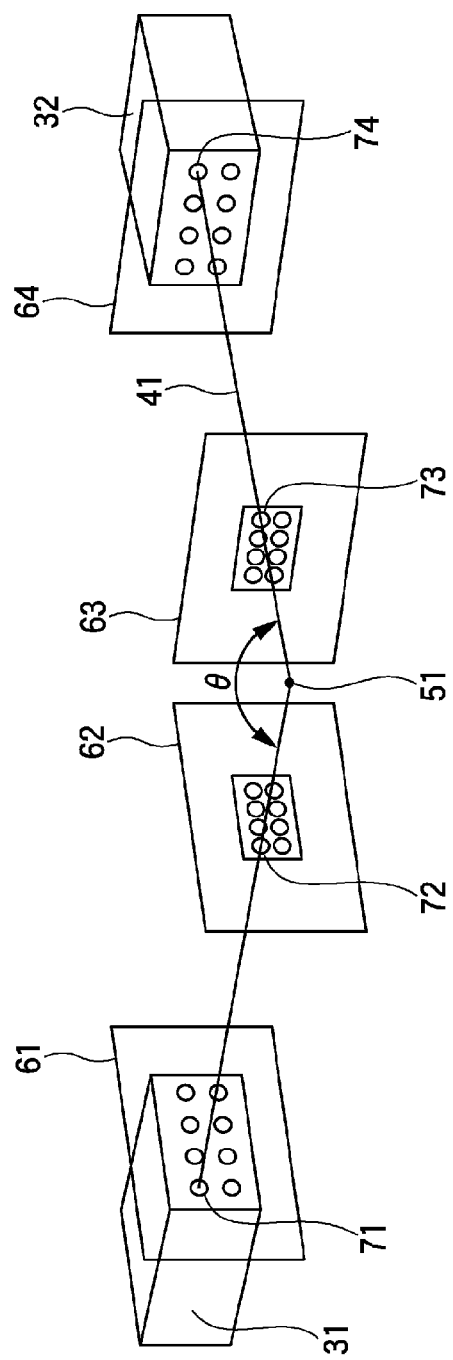
FIG. 4 is a diagram showing a simple model for calculating the electrical wire length, which includes four reference cross sections and passing points and nodes when the electrical wire passes through the reference cross sections.

Hereinafter, an overview of the electrical wire length output method using the wire harness analyzer of the embodiment of the present invention will be described. FIG. 4 is a diagram showing a simple model for calculating the electrical wire length, which includes four reference cross sections and passing points and nodes when the electrical wire passes through the reference cross sections.

In the electrical wire length calculation method according to the embodiment of the present invention, information required as input information for the calculation is appropriately extracted from the electrical wire shape information, the connector shape information, and the jig shape information that are used when modeling the wire harness. The electrical wire shape information is information defining the specifications of the electrical wire of the wire harness arranged in a vehicle. The connector shape information is information defining the specifications of the connector of the wire harness arranged in a vehicle. The jig shape information is information defining the shape and arrangement position of the fixture (U fork for bending the electrical wire, a fixture for fixing a connector, or the like) provided in the jig plate.

Based on the extracted information, a simple model shown in FIG. 4 is created. The simple model shown in FIG. 4 is obtained by modeling the passing point through which an electrical wire 41, which is arranged over a jig plate and of which one end is connected to a first connector 31 and the other end is connected to a second connector 32, passes. More specifically, the simple model shown in FIG. 4 is obtained by specifying the position coordinates of the passing points when the electrical wire 41, which is bent by a predetermined angle $\theta$ at a certain point 51, passes through the cross sections 61, 62, 63, and 64. The point where the electrical wire 41 is bent will be referred to as a node hereinafter.

Additionally, the arrangement position of the fixture that fixes connectors 31 and 32 over the jig plate, the arrangement position of the U fork on the jig plate, and the cavity positions of the connectors 31 and 32 into which one end and the other end of the electrical wire 41 are inserted can be read from the electrical wire shape information, the connector shape information, and the jig shape information that are used when modeling the wire harness. From such information, a path, along which the electrical wire 41 is arranged over the jig plate, and the position of a node 51 are specified for each electrical wire.

<Cross Section Setting Process>

For the simple model that is modeled in this manner, information for specifying the cross sections 61, 62, 63, and 64 is input to form the cross sections 61, 62, 63, and 64 on the simple model.

The cross section 61 is a plane including one end of the electrical wire 41 connected to the first connector 31. Hereinafter, the cross section 61 will be referred to as a first cavity reference cross section. The cross section 64 is a plane including the other end of the electrical wire 41 connected to the second connector 32. Hereinafter, the cross section 64 will be referred to as a second cavity reference cross section. Usually, a plurality of electrical wires are connected to the connectors. Therefore, if the coordinates of one end and the other end of the electrical wire are extracted with reference to the connector shape information, the first cavity reference cross section 61 and the second cavity reference cross section 64 can be uniquely determined.

The cross section 62 is a plane, in parallel to parallel to the first cavity reference cross section 61, that is located to be separated by a predetermined distance from the node 51 toward the first cavity reference cross section 61. Hereinafter, the cross section 62 will be referred to as a first node reference cross section. The cross section 63 is a plane, in parallel to the second cavity reference cross section 64, that is located to be separated by a predetermined distance from the node 51 toward the second cavity reference cross section 64. Hereinafter, the cross section 63 will be referred to as a second node reference cross section. The first node reference cross section 62 is a surface facing the first cavity reference cross section 61 to be parallel to the first cavity reference cross section 61, and the second node reference cross section 63 is a surface facing the second cavity reference cross section 64 to be parallel to the second cavity reference cross section 64. The first and second node reference cross sections 62 and 63 are determined such that the normal lines extending therefrom form the predetermined angle $\theta$. The first and second node reference cross sections 62 and 63 can be uniquely determined if the first and second cavity reference cross sections 61 and 64 are determined and a predetermined distance is determined from the node 51.

Figure 5A:
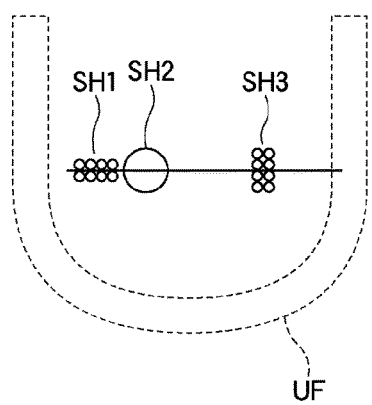
FIGS. 5A and 5B are cross-sectional views of an electrical wire cut by the plane passing through a node, where
Figure 5B:
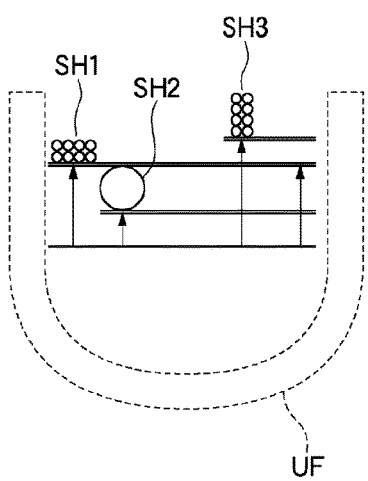

The position of the node 51 of the electrical wire 41 is determined by referring to the position coordinates of the U fork and the shape of the U fork from the jig shape information. FIGS. 5A and 5B are cross-sectional views of an electrical wire cut by the plane passing through the node. FIG. 5A is a diagram obtained by dispersing the nodes of various electrical wires in the width direction of the U fork, and FIG. 5B is a diagram obtained by dispersing the nodes of various electrical wires in the height direction of the U fork.

The node 51 is determined as a position where a sub-harness is bent or as a position where electrical wires that form a sub-harness branch. If the same position coordinates are assigned to the nodes of certain two electrical wires, the two electrical wires intersect with each other. This makes it difficult to calculate the accurate electrical wire length. Therefore, in the embodiment of the present invention, as shown in FIG. 5A, the setting positions of nodes are set to be dispersed in the width direction (horizontal direction in FIG. 5A) of a U fork UF. In this case, the setting positions of nodes are concentrated in units of sub-harnesses SH1, SH2, and SH3.

In addition, as shown in FIG. 5A, a case can be considered in which a bent electrical wire having a large predetermined angle θ and an electrical wire having a small predetermined angle θ intersect with each other even if the setting positions of nodes are dispersed in the width direction of the U fork UF. Therefore, as shown in FIG. 5B, it is preferable to disperse the setting positions of nodes in the height direction (vertical direction in FIG. 5B) of the U fork UF. In the electrical wire length output method using the wire harness analyzer of the embodiment of the present invention, by setting the positions of nodes as described above, it is possible to set the optimal electrical wire length, that is, it is possible to set the length of the electrical wire passing through the shortest path without intersecting with other electrical wires.

<Passing Point Calculation Process>

Subsequently, a passing point where the electrical wire 41 passes through each cross section of the first cavity reference cross section 61, the first node reference cross section 62, the second node reference cross section 63, and the second cavity reference cross section 64 is calculated. A first passing point 71 where the electrical wire 41 passes through the first cavity reference cross section 61 can be calculated by specifying the position of the cavity in the first connector 31 with reference to the connector shape information. A second passing point 72 where the electrical wire 41 passes through the first node reference cross section 62 can be calculated as a point where the line segment connecting the first passing point 71 and the node 51 to each other crosses the first node reference cross section 62, that is, as a point where the first passing point 71 is projected onto the first node reference cross section 62 in the longitudinal direction of the electrical wire 41. A third passing point 73 where the electrical wire 41 passes through the second node reference cross section 63 can be calculated as a point where the line segment connecting a fourth passing point 74, which will be described later, and the node 51 to each other crosses the second node reference cross section 63, that is, as a point where the fourth passing point 74 is projected onto the second node reference cross section 63 in the longitudinal direction of the electrical wire 41. The fourth passing point 74 where the electrical wire 41 passes through the second cavity reference cross section 64 can be calculated by specifying the position of the cavity in the second connector 32 with reference to the connector shape information.

As shown in FIG. 4, the first and second cavity reference cross sections 61 and 64 have the same shape. Accordingly, if the first and fourth passing points 71 and 74 are located so as to face each other when the first and second cavity reference cross sections 61 and 64 are made to face each other, the third passing point 73 can be calculated as follows. That is, the third passing point 73 can also be calculated as a point obtained by rotating the second passing point 72 by the predetermined angle θ with respect to the axis parallel to a direction in which the node 51 passes and the U fork is erected, that is, as a point obtained by rotating and projecting the second passing point 72 with respect to the axis.

<Section Wire Length Calculation Process>

Subsequently, the wire length of the electrical wire 41 in each of a section from the first cavity reference cross section 61 to the first node reference cross section 62, a section from the first node reference cross section 62 to the second node reference cross section 63, and a section from the second node reference cross section 63 to the second cavity reference cross section 64 is calculated (wire length of the electrical wire 41 located in each section is referred to as a section wire length). The section wire length of the section from the first cavity reference cross section 61 to the first node reference cross section 62 is calculated from the position coordinates of the first passing point 71 and the position coordinates of the second passing point 72. In addition, the section wire length of the section from the first node reference cross section 62 to the second node reference cross section 63 is calculated from the position coordinates of the second passing point 72, the position coordinates of the third passing point 73, the position coordinates of the node 51, and the predetermined angle θ. In addition, the section wire length of the section from the second node reference cross section 63 to the second cavity reference cross section 64 is calculated from the position coordinates of the third passing point 73 and the position coordinates of the fourth passing point 74. A specific method of calculating the section wire length will be described later.

<Electrical Wire Length Calculation Process>

The sum of the section wire lengths in the respective sections calculated in the item <Section wire length calculation process> is output as the electrical wire length of the electrical wire 41.

Figure 6A:
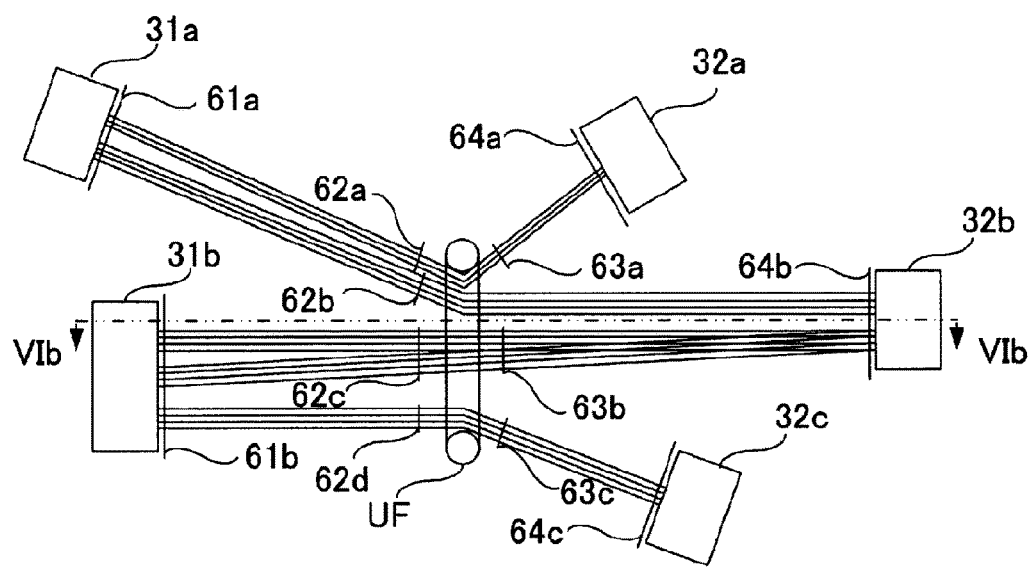
FIGS. 6A and 6B are schematic diagrams of a simple model when the arrangement over a jig plate is assumed, where
Figure 6B:
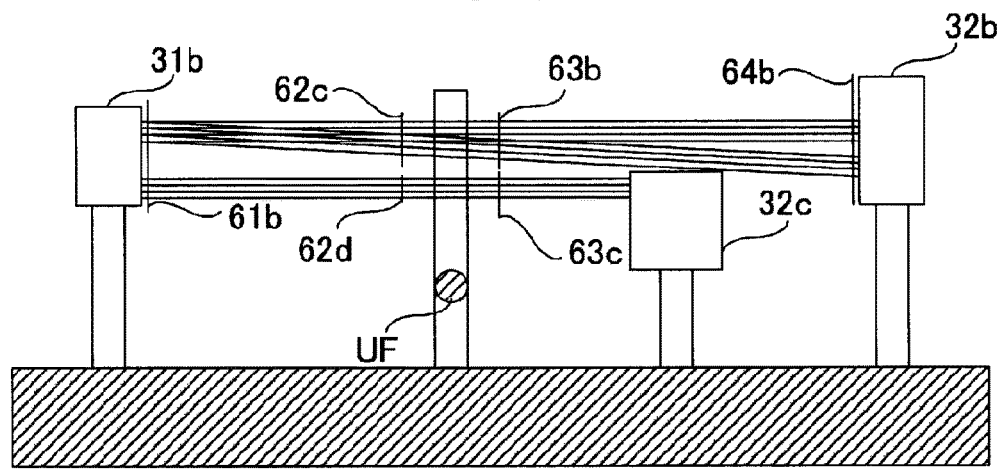

In the above electrical wire length calculation method, the process of calculating the electrical wire length for one electrical wire 41 as shown in FIG. 4 has been described. This process is also performed for other electrical wires. In the simple model shown in FIG. 4, the electrical wire lengths of other seven electrical wires that form the same sub-harness as the electrical wire 41 are calculated, and the electrical wire lengths of electrical wires that form each sub-harness are also calculated for the other sub-harnesses SH1, SH2, and SH3 shown in FIGS. 5A and 5B. The wire harness in which the electrical wire length is calculated in this manner is conceptualized as shown in FIGS. 6A and 6B. FIG. 6 is a schematic diagram of a simple model when the arrangement over the jig plate is assumed. FIG. 6A is a diagram when the jig plate is viewed from above, and FIG. 6B is a cross-sectional view taken along the line VIb-VIb in FIG. 6A.

In FIG. 6A, the U fork UF, first connectors 31a and 31b, and second connectors 32a, 32b, and 32c are provided over the jig plate. By performing the <Cross section setting process> described above, first cavity reference cross sections 61a and 61b, first node reference cross sections 62a, 62b, 62c, and 62d, second node reference cross sections 63a, 63b, and 63c, and second cavity reference cross sections 64a, 64b, and 64c are determined.

As shown in FIGS. 6A and 6B, in the sub-harness whose both ends are connected to the first connectors 31a and 31b and the second connectors 32a, 32b, and 32c, cavity positions in each connector are dispersed in the width direction and the height direction of the connector. In addition, as described with reference to FIGS. 5A and 5B, nodes of various electrical wires are dispersed in the width direction and the height direction of the U fork. For this reason, in the simple model, the sub-harness is set so that any two electrical wires do not intersect with each other. Thus, in the electrical wire length output method using the wire harness analyzer according to the embodiment of the present invention, by taking the wiring position of the electrical wire and the position of the node into consideration, it is possible to set the optimal electrical wire length, that is, it is possible to set the length of the electrical wire passing through the shortest path without intersecting with other electrical wires.

Incidentally, the electrical wire lengths of the electrical wires calculated as described above are different even if the common connectors 31 and 32 are fixed to both ends of all of the electrical wires. In electrical wires that form an actual wire harness, when the common connectors 31 and 32 are fixed to both ends of all of the electrical wires, the electrical wire lengths are uniform in many cases. Ideally, however, it is preferable that the electrical wire lengths be different. Taking this into consideration, the following points are further taken into account in the electrical wire length output method using the wire harness analyzer of the embodiment of the present invention.

In the section from the first cavity reference cross section 61 to the first node reference cross section 62 and the section from the second node reference cross section 63 to the second cavity reference cross section 64, the second passing point 72 is a point obtained by projecting the first passing point 71 onto the first node reference cross section 62, and the third passing point 73 is a point obtained by projecting the fourth passing point 74 onto the second node reference cross section 63. Therefore, the density per unit area where eight second passing points 72 or eight third passing points 73 are present is larger than the density per unit area where eight first passing points 71 or eight fourth passing points 74 are present. For this reason, the electrical wire length in the corresponding section becomes larger as the first passing point 71 or the fourth passing point 74 of the electrical wire is located on the outer side, and the electrical wire length in the corresponding section becomes smaller as the first passing point 71 or the fourth passing point 74 of the electrical wire is located on the inner side. On the other hand, in the electrical wires of an actual wire harness, there are portions that are tied together by taping. In an electrical wire bundle of such a harness, in each section that is not taped from the connector to the taped portion, the electrical wire length in the section becomes larger as the electrical wire is located on the outer side of the connector, and the electrical wire length in the section becomes smaller as the electrical wire is located on the inner side of the connector (refer to FIG. 8 to be described later). In the embodiment of the present invention, in order to take into consideration a difference in the electrical wire length of such an actual wire harness, the second passing point 72 is obtained by projecting the first passing point 71 onto the first node reference cross section 62 and the third passing point 73 is obtained by projecting the fourth passing point 74 onto the second node reference cross section 63 in the section from the first cavity reference cross section 61 to the first node reference cross section 62 and the section from the second node reference cross section 63 to the second cavity reference cross section 64. Thus, in the electrical wire length output method using the wire harness analyzer of the embodiment of the present invention, by considering the different electrical wire length for each wiring position, it is possible to set the optimal electrical wire length, that is, it is possible to set the electrical wire length after suppressing the situation where the length of the electrical wire is set to be too small.

Figure 10:
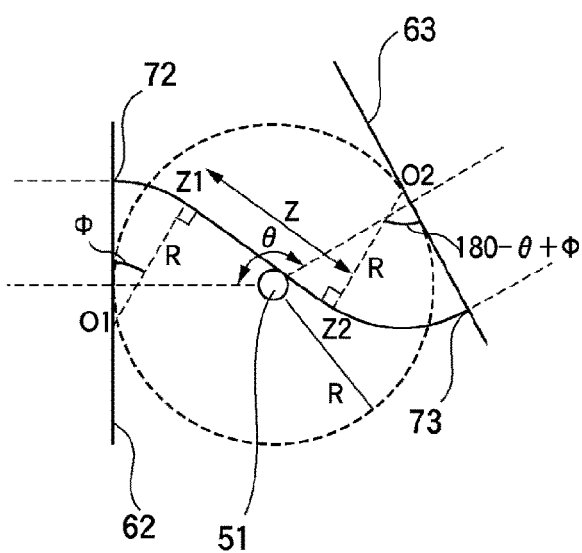
FIG. 10 is a diagram for explaining a method of calculating the section wire length of a section from a first node reference cross section to a second node reference cross section.

In the section from the first node reference cross section 62 to the second node reference cross section 63, the third passing point 73 can be calculated as a point obtained by rotating the second passing point 72 by the predetermined angle θ with respect to the axis parallel to a direction in which the node 51 passes and the U fork is erected. For this reason, the electrical wire length in the corresponding section becomes larger as the second passing point 72 of the electrical wire is located further away from the node 51, and the electrical wire length in the corresponding section becomes smaller as the second passing point 72 of the electrical wire is located closer to the node 51. On the other hand, also in the electrical wire bundle of an actual wire harness, the electrical wire length becomes larger as the electrical wire is located at the outer side from the bending point, and the electrical wire length becomes smaller as the electrical wire is located at the inner side from the bending point. In the embodiment of the present invention, in order to take into consideration the difference in the electrical wire length of such an actual wire harness, a method to be described later with reference to FIG. 10 is adopted. Thus, in the electrical wire length output method using the wire harness analyzer of the embodiment of the present invention, by considering the different electrical wire length for each wiring position, it is possible to set the optimal electrical wire length, that is, it is possible to set the electrical wire length after suppressing the situation where the length of the electrical wire is set to be too small.

The above is an overview of the electrical wire length output method using the wire harness analyzer of the embodiment of the present invention.

[Details of the Electrical Wire Length Calculation Method]

Subsequently, details of the electrical wire length output method using the wire harness analyzer of the embodiment of the present invention will be described.

Figure 7:
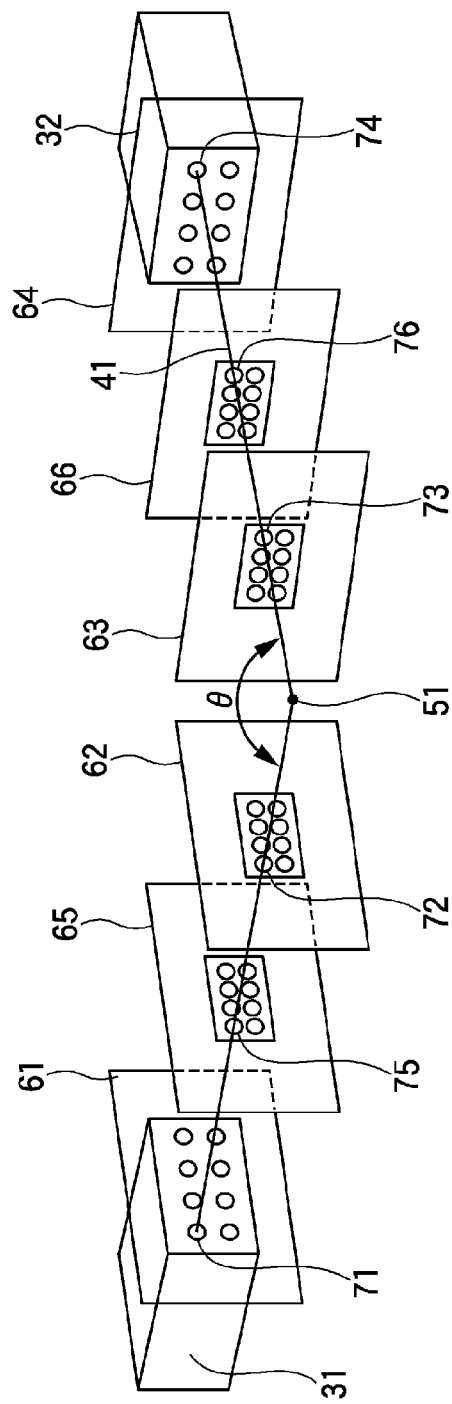
FIG. 7 is a diagram showing a simple model for calculating the electrical wire length, which includes six reference cross sections and passing points and nodes when the electrical wire passes through the reference cross sections.
Figure 8:
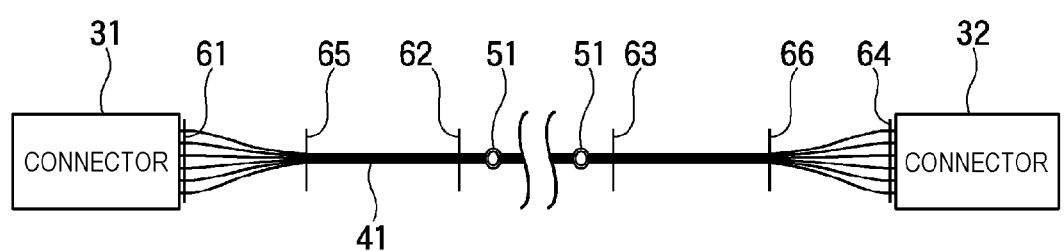
FIG. 8 is a diagram for explaining the position of each reference cross section in an electrical wire bundle of a wire harness.

In the item [Overview of the electrical wire length calculation method] described above, as shown in FIG. 4, a total of four cross sections of the first cavity reference cross section 61, the first node reference cross section 62, the second node reference cross section 63, and the second cavity reference cross section 64 are formed on a simple model. In a more preferred embodiment, a total of six cross sections 61 to 66 are formed on a simple model by adding two cross sections 65 and 66. FIG. 7 is a diagram showing a simple model for calculating the electrical wire length, which includes six reference cross sections and passing points and nodes when the electrical wire passes through the reference cross sections. FIG. 8 is a diagram for explaining the position of each reference cross section in the electrical wire bundle of the wire harness.

<Cross Section Setting Process>

The cross section 65 is a cross section that is located between the first cavity reference cross section 61 and the first node reference cross section 62 to be separated by a predetermined distance from the first cavity reference cross section 61. Hereinafter, the cross section 65 will be referred to as a first segment reference cross section. The first segment reference cross section 65 is a cross section parallel to the first cavity reference cross section 61 and the first node reference cross section 62. The first segment reference cross section 65 is a cross section that divides the section from the first cavity reference cross section 61 to the first node reference cross section 62, which has been described in the above item [Overview of the electrical wire length calculation method], into two sections. The cross section 66 is a cross section that is located between the second cavity reference cross section 64 and the second node reference cross section 63 to be separated by a predetermined distance from the second cavity reference cross section 64. Hereinafter, the cross section 66 will be referred to as a second segment reference cross section. The second segment reference cross section 66 is a cross section parallel to the second cavity reference cross section 64 and the second node reference cross section 63. The second segment reference cross section 66 is a cross section that divides the section from the second node reference cross section 63 to the second cavity reference cross section 64, which has been described in the above item [Overview of the electrical wire length calculation method], into two sections. By adding the first and second segment reference cross sections 65 and 66, it is possible to calculate the electrical wire length in the wire harness based on the actual shape.

There are the following implications for the positions where the first and second segment reference cross sections 65 and 66 are set. That is, in the electrical wires of an actual wire harness, there are portions that are tied together by taping. Each of the positions where the first and second segment reference cross sections 65 and 66 are set is a boundary, which separates sections that are not taped from each other, in an electrical wire bundle of such a wire harness. This will be described with reference to FIG. 8. Electrical wire bundles located in a section from the first cavity reference cross section 61 to the first segment reference cross section 65 and a section from the second segment reference cross section 66 to the second cavity reference cross section 64 are not taped, but the electrical wires are loose. On the other hand, electrical wire bundles located in a section from the first segment reference cross section 65 to the first node reference cross section 62 and a section from the second node reference cross section 63 to the second segment reference cross section 66 are taped. Thus, the first and second segment reference cross sections 65 and 66 serve to define a taped section. In addition, information about the taped section is included in the electrical wire shape information, so that the positions where the first and second segment reference cross sections 65 and 66 are set can be specified based on the information. In FIG. 8, a plurality of nodes 51 are determined taking into consideration that electrical wires arranged over the jig plate are bent or branched at a plurality of points.

<Passing Point Calculation Process>

Subsequently, a passing point where the electrical wire 41 passes through each cross section of the first cavity reference cross section 61, the first segment reference cross section 65, the first node reference cross section 62, the second node reference cross section 63, the second segment reference cross section 66, and the second cavity reference cross section 64 is calculated. Due to the first and second segment reference cross sections 65 and 66 being newly set, the method of calculating the second passing point 72 passing through the first node reference cross section 62 is changed. For this reason, the method of calculating the passing point passing through each cross section of the first segment reference cross section 65, the first node reference cross section 62, and the second segment reference cross section 66 will be described. For the method of calculating the passing point passing through each cross section of the first cavity reference cross section 61, the second node reference cross section 63, and the second cavity reference cross section 64, repeated descriptions will be avoided.

A fifth passing point 75 where the electrical wire 41 passes through the first segment reference cross section 65 can be calculated as a point where the line segment connecting the first passing point 71 and the node 51 to each other crosses the first segment reference cross section 65, that is, as a point where the first passing point 71 is projected onto the first segment reference cross section 65 in the longitudinal direction of the electrical wire 41. Therefore, in a certain electrical wire bundle, the density of passing points occupied per unit area in the case of the fifth passing point 75 passing through the first segment reference cross section 65 is larger than that in the case of the first passing point 71 passing through the first cavity reference cross section 61.

In addition, the second passing point 72 where the electrical wire 41 passes through the first node reference cross section 62 is calculated as a point where a straight line, which extends in a normal line direction of the first segment reference cross section 65 from the fifth passing point 75 passing through the first segment reference cross section 65, crosses the first node reference cross section 62, that is, as a point obtained by projecting the fifth passing point 75 onto the first node reference cross section 62 in the normal line direction of the first segment reference cross section 65. The reason why the second passing point 72 is calculated as a point obtained by projecting the fifth passing point 75 onto the first node reference cross section 62 in the normal line direction of the first segment reference cross section 65 as described above is that the electrical wire bundle located in the section from the first segment reference cross section 65 to the first node reference cross section 62 is taped. That is, this is because it can be regarded that the diameter of the electrical wire bundle located in the section from the first segment reference cross section 65 to the first node reference cross section 62 is approximately fixed.

In addition, a sixth passing point 76 where the electrical wire 41 passes through the second segment reference cross section 66 can be calculated as a point where the line segment connecting the fourth passing point 74 and the node 51 to each other crosses the second segment reference cross section 66, that is, as a point where the fourth passing point 74 is projected onto the second segment reference cross section 66 in the longitudinal direction of the electrical wire 41. Therefore, in a certain electrical wire bundle, the density of passing points occupied per unit area in the case of the sixth passing point 76 passing through the second segment reference cross section 66 is larger than that in the case of the fourth passing point 74 passing through the second cavity reference cross section 64.

In addition, the third passing point 73 where the electrical wire 41 passes through the second node reference cross section 63 is calculated as a point where a straight line, which extends in a normal line direction of the second segment reference cross section 66 from the sixth passing point 76 passing through the second segment reference cross section 66, crosses the second node reference cross section 63, that is, as a point obtained by projecting the sixth passing point 76 onto the second node reference cross section 63 in the normal line direction of the second segment reference cross section 66. The reason why the third passing point 73 is calculated as a point obtained by projecting the sixth passing point 76 onto the second node reference cross section 63 in the normal line direction of the second segment reference cross section 66 as described above is that the electrical wire bundle located in the section from the second node reference cross section 63 to the second segment reference cross section 66 is taped. That is, this is because it can be regarded that the diameter of the electrical wire bundle located in the section from the second node reference cross section 63 to the second segment reference cross section 66 is approximately fixed.

<Section Wire Length Calculation Process>

Subsequently, the section wire length of the electrical wire 41 in each of the section from the first cavity reference cross section 61 to the first segment reference cross section 65, the section from the first segment reference cross section 65 to the first node reference cross section 62, the section from the first node reference cross section 62 to the second node reference cross section 63, the section from the second node reference cross section 63 to the second segment reference cross section 66, and the section from the second segment reference cross section 66 to the second cavity reference cross section 64 is calculated.

Figure 9B:
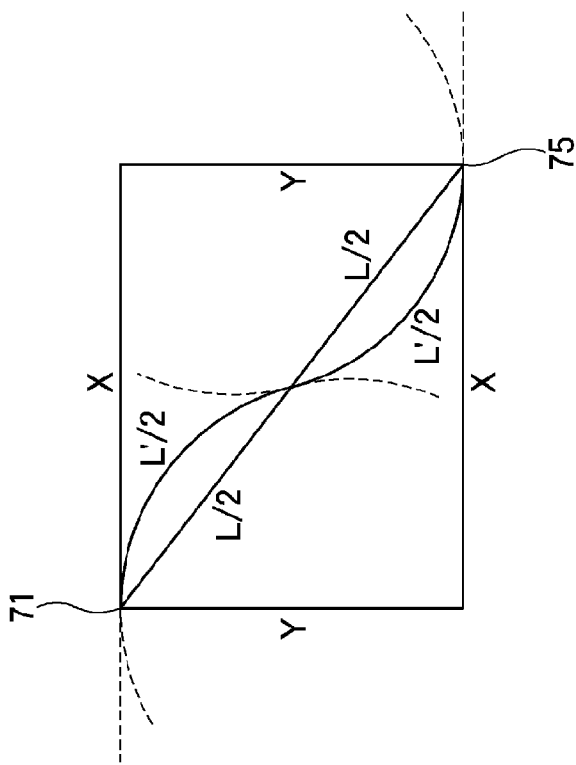
FIGS. 9A and 9B are diagrams for explaining the method of calculating the section wire length of the section from the first cavity reference cross section to the first segment reference cross section, where
Figure 9A:
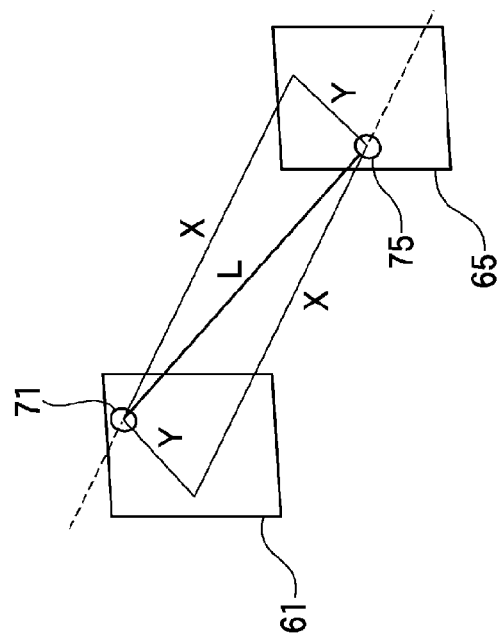

First, a method of calculating the section wire length of the section from the first cavity reference cross section 61 to the first segment reference cross section 65 and the section wire length of the section from the second segment reference cross section 66 to the second cavity reference cross section 64 will be described in detail. FIGS. 9A and 9B are diagrams for explaining the method of calculating the section wire length of the section from the first cavity reference cross section to the first segment reference cross section. FIG. 9A is a perspective view when viewed from above the first cavity reference cross section and the first segment reference cross section, and FIG. 9B is a side view when the perspective view of FIG. 9A is viewed from the side.

The section wire length of the section from the first cavity reference cross section 61 to the first segment reference cross section 65 is calculated from the position coordinates of the first passing point 71 and the position coordinates of the fifth passing point 75. That is, the section wire length of the above section is calculated from two Expressions (1) and (2) shown below.

$$Y = \operatorname{sqrt}(L \times L - X \times X) \tag{1}$$

$$L' = (X \times X / Y + Y) \times a \tan(Y/X) \tag{2}$$

Here, L is the length of a line segment connecting the first and fifth passing points 71 and 75 to each other. X is a distance between the first cavity reference cross section 61 and the first segment reference cross section 65. Y is the length of the side different from X of the rectangle having L as a diagonal line. L' is the section wire length of the section from the first cavity reference cross section 61 to the first segment reference cross section 65.

As shown in FIG. 9B, the section wire length L' calculated from the two Expressions (1) and (2) is calculated by calculating the wire length L'/2 of the locus drawn in a range of π/2 formed by the major axis and the minor axis of an ellipse, in which the length of the major axis is X/2 and the length of the minor axis is Y/2, and doubling the value. In order to accurately calculate the section wire length, it is necessary to consider that bending and twisting occur due to bending action or the gravity that acts on the electrical wire. The wire length L'/2 of the locus drawn by the ellipse is obtained by taking the bending and twisting into consideration. Thus, in the electrical wire length output method using the wire harness analyzer of the embodiment of the present invention, by taking the bending and twisting of the electrical wire into consideration, it is possible to set the optimal electrical wire length, that is, it is possible to set the electrical wire length after suppressing the situation where the length of the electrical wire is set to be too small.

In addition, the section wire length of the section from the second segment reference cross section 66 to the second cavity reference cross section 64 is calculated from the position coordinates of the sixth passing point 76 and the position coordinates of the fourth passing point 74. The section wire length of the above section is also calculated from Expressions (1) and (2). In the above-described method of calculating the section wire length of the section from the first cavity reference cross section 61 to the first segment reference cross section 65, the first passing point 71 is replaced with the fourth passing point 74, and the fifth passing point 75 is replaced with the sixth passing point 76.

Next, a method of calculating the section wire length of each of the section from the first segment reference cross section 65 to the first node reference cross section 62 and the section from the second node reference cross section 63 to the second segment reference cross section 66 will be described in detail. It can be regarded that the diameter of the electrical wire bundle located in the section from the first segment reference cross section 65 to the first node reference cross section 62 and the section from the second node reference cross section 63 to the second segment reference cross section 66 is approximately fixed, and it can be regarded that the taped electrical wire bundle has a rod shape. Therefore, it is assumed that, in these sections, the lengths of respective electrical wires of the electrical wire bundle are the same. Based on such assumption, the section wire length of the section from the first segment reference cross section 65 to the first node reference cross section 62 is the same as the distance between the first segment reference cross section 65 and the first node reference cross section 62. In addition, the section wire length of the section from the second node reference cross section 63 to the second segment reference cross section 66 is the same as the distance between the second node reference cross section 63 and the second segment reference cross section 66.

Next, a method of calculating the section wire length of the section from the first node reference cross section 62 to the second node reference cross section 63 will be described in detail. FIG. 10 is a diagram for explaining the method of calculating the section wire length of the section from the first node reference cross section to the second node reference cross section.

As described in <Passing point calculation process>, the second passing point 72 is obtained by performing projection onto the first node reference cross section 62 so that the distribution of the first passing point 71 of the first cavity reference cross section 61 is reduced, and the third passing point 73 is obtained by performing projection onto the second node reference cross section 63 so that the distribution of the fourth passing point 74 of the second cavity reference cross section 64 is reduced. Incidentally, in the simple model shown in FIG. 7, the first and second cavity reference cross sections 61 and 64 have the same shape, and the first and fourth passing points 71 and 74 are located so as to face each other when the first and second cavity reference cross sections 61 and 64 are made to face each other. In other words, the cavity position where the terminal is housed in the first connector 31, which defines the position coordinates of the first passing point 71, and the cavity position where the terminal is housed in the second connector 32, which defines the position coordinates of the fourth passing point 74, face each other with the node 51 interposed therebetween. In such a case, the section wire length of the section from the first node reference cross section 62 to the second node reference cross section 63 can be calculated as the length of an arc, which connects the second and third passing points 72 and 73, on the circumference of a circle having a center at the position coordinates of the node 51 and a radius corresponding to the distance from the node 51 to the first node reference cross section 62 (or the second node reference cross section 63).

However, if connectors connected to both ends of a sub-harness are made to have the same shape as described above and the cavity positions where the terminals are housed in the connectors are symmetrical with respect to the node, the degree of freedom in designing the sub-harness is significantly limited. For this reason, a method capable of calculating the section wire length of the section from the first node reference cross section 62 to the second node reference cross section 63 even if connectors connected to both ends of a sub-harness have different shapes is required. Therefore, a method, which does not depend on the shapes of connectors connected to both ends of a sub-harness and in which there is no restriction on the position of the cavity formed in each connector, is proposed. This method is adopted to calculate the section wire length of the section from the first node reference cross section 62 to the second node reference cross section 63.

As shown in FIG. 10, the second and third passing points 72 and 73 do not face each other when the first and second node reference cross sections 62 and 63 are made to face each other in parallel. In this case, the section wire length of the section from the first node reference cross section 62 to the second node reference cross section 63 is calculated from Expression (3) shown below.

$$L' = Z + 2\pi R\{(2\phi + 180 - \theta)/360\} \quad (3)$$

Here, R is a predetermined distance from the node 51 to the first node reference cross section 62 or the second node reference cross section 63. $\phi$ is an acute angle formed by the line segment connecting the second passing point 72, a point O1, and a point Z1. In addition, the point O1 is a point located toward the widthwise center of the first node reference cross section 62 by a predetermined distance R from the second passing point 72. The point O2 is a point located toward the widthwise center of the second node reference cross section 63 by the predetermined distance R from the third passing point 73. Z is a line segment connecting the points Z1 and Z2 to each other, and is perpendicular to the line segment O1Z1 and the line segment O2Z2.

Schematically, the section wire length L' of the section from the first node reference cross section 62 to the second node reference cross section 63 is the length of the solid line shown in FIG. 10, and is calculated by the sum of the length of an arc equivalent to an angle $\phi/360$ on the circumference of a circle having a center at the point O1 and a radius R, the length of the line segment Z connecting the points Z1 and Z2 to each other, and the length of an arc equivalent to an angle $(180-\theta+\phi)/360$ on the circumference of a circle having a center at the point O2 and a radius R.

The section wire length L' calculated from Expression (3) is calculated by taking the length of the arc into consideration, as shown in FIG. 10. Incidentally, in order to accurately calculate the section wire length, it is necessary to consider that bending and twisting occur due to bending action or the gravity that acts on the electrical wire. It is assumed that the length of the arc included in the section wire length L' is set in consideration of the bending and twisting. Thus, in the electrical wire length output method using the wire harness analyzer of the embodiment of the present invention, by taking the bending and twisting of the electrical wire into consideration, it is possible to set the optimal electrical wire length, that is, it is possible to set the electrical wire length after suppressing the situation where the length of the electrical wire is set to be too small.

<Electrical Wire Length Calculation Process>

The sum of the section wire lengths in the respective sections calculated in the item <Section wire length calculation process> is output as the electrical wire length of the electrical wire 41.

The electrical wire length output method using the wire harness analyzer according to the embodiment of the present invention has been described hereinbefore. According to the electrical wire length output method and the electrical wire length output program of the present invention, it is possible to calculate the electrical wire length of each electrical wire that forms a wire harness before modeling the wire harness arranged over the jig plate. Therefore, it is possible to reduce the time and effort required for the analyst to set the electrical wire length, and it is possible to reduce the chance of re-modeling the wire harness when setting the incorrect electrical wire length.

Here, the features of the embodiment of the electrical wire length output method and the electrical wire length output program according to the present invention described above are briefly summarized in the following [1] to [4].

[1] An electrical wire length output method for calculating a wire length of each electrical wire using an analyzer, wherein the electrical wire arranged over a jig plate includes one end connected to a first connector and the other end connected to a second connector, the electrical wire length output method including:

an input step of receiving an input of information for specifying at least a first cavity reference cross section that is a plane including the one end of the electrical wire connected to the first connector, a second cavity reference cross section that is a plane including the other end of the electrical wire connected to the second connector, a first node reference cross section that is a plane, in parallel to the first cavity reference cross section, located to be separated by a predetermined distance toward the first cavity reference cross section from a bending point where the electrical wire is bent, and a second node reference cross section that is a plane, in parallel to the second cavity reference cross section, located to be separated by the predetermined distance toward the second cavity reference cross section from the bending point;

a passing point calculation step of calculating a passing point where the electrical wire passes through each cross section of the first cavity reference cross section, the first node reference cross section, the second node reference cross section, and the second cavity reference cross section;

a section wire length calculation step of calculating a section wire length in a section from the first cavity reference cross section to the first node reference cross section based on position coordinates of a first passing point where the electrical wire passes through the first cavity reference cross section and position coordinates of a second passing point where the electrical wire passes through the first node reference cross section, calculating a section wire length in a section from the first node reference cross section to the second node reference cross section based on the position coordinates of the second passing point where the electrical wire passes through the first node reference cross section, position coordinates of a third passing point where the electrical wire passes through the second node reference cross section and a bending angle of the electrical wire at the bending point, and calculating a section wire length in a section from the second node reference cross section to the second cavity reference cross section based on the position coordinates of the third passing point where the electrical wire passes through the second node reference cross section and position coordinates of a fourth passing point where the electrical wire passes through the second cavity reference cross section; and an output step of outputting, as the wire length of the electrical wire, a sum of the section wire lengths in the respective sections calculated in the section wire length calculation step.

[2] The electrical wire length output method according to the configuration of the above [1], wherein the input step further receives an input of information for specifying a first segment reference cross section, which is located between the first cavity reference cross section and the first node reference cross section in parallel to the first cavity reference cross section and the first node reference cross section, and a second segment reference cross section, which is located between the second cavity reference cross section and the second node reference cross section in parallel to the second cavity reference cross section and the section node reference cross section, wherein a density of a fifth passing point passing through the first segment reference cross section occupied per unit area is larger than a density of the first passing point passing through the first segment reference cross section occupied per unit area and a density of a sixth passing point passing through the second segment reference cross section occupied per unit area is larger than a density of the fourth passing point passing through the second segment reference cross section occupied per unit area, the passing point calculation step further calculates a passing point where the electrical wire passes through each cross section of the first and second segment reference cross sections, and the section wire length calculation step further calculates a section wire length in a section from the first cavity reference cross section to the first segment reference cross section based on the position coordinates of the first passing point and position coordinates of the fifth passing point, calculates a section wire length in a section from the first segment reference cross section to the first node reference cross section based on the position coordinates of the fifth passing point and the position coordinates of the second passing point, calculates a section wire length in a section from the second node reference cross section to the second segment reference cross section based on the position coordinates of the third passing point and position coordinates of the sixth passing point, and calculates a section wire length in a section from the second segment reference cross section to the second cavity reference cross section based on the position coordinates of the sixth passing point and the position coordinates of the fourth passing point.

[3] The electrical wire length output method according to the configuration of the above [2], wherein the passing point calculation step calculates the second passing point or the fifth passing point by projecting a reduction of a distribution of the first passing point on the first cavity reference cross section onto the first node reference cross section or the first segment reference cross section, and calculates the third passing point or the sixth passing point by projecting a reduction of a distribution of the fourth passing point on the second cavity reference cross section onto the second node reference cross section or the second segment reference cross section.

[4] An electrical wire length output program for causing a computer to execute each step of the electrical wire length output method according to any one of the configurations of the above [1] to [3].

While the present invention has been described in detail with reference to the specific embodiments, it is apparent to those skilled in the art that various changes and modifications may be made without departing from the spirit and scope of the present invention.

The present invention relates to the electrical wire length output method and the electrical wire length output program that are used to determine the electrical wire length of each electrical wire that forms a wire harness, and is advantageous in that it is possible to calculate the electrical wire length of each electrical wire that forms a wire harness before modeling the wire harness arranged over the jig plate.

What is claimed is:

1. An electrical wire length output method for calculating a wire length of an electrical wire using an analyzer, wherein the electrical wire arranged over a jig plate includes a first end connected to a first connector and a second end connected to a second connector, the electrical wire length output method comprising:

specifying, as input information electric wire shape information, connector shape information, and jig shape information;

extracting, as extraction information, from the input information, at least a location of a first cavity reference cross section that is in a plane perpendicular to an extension direction of the electrical wire and including the first end of the electrical wire connected to the first connector, a location of a second cavity reference cross section that is in a plane perpendicular to an extension direction of the electrical wire and including the second end of the electrical wire connected to the second connector, a location of a first node reference cross section that is in a plane that is in parallel to the plane in which the first cavity reference cross section is disposed, the first node reference cross section being located so as to be separated by a first predetermined distance toward the first cavity reference cross section from a bending point in the electrical wire where the electrical wire is bent, and a location of a second node reference cross section that is in a plane that is in parallel to the plane in which the second cavity reference cross section is disposed, the second node reference cross section being located so as to be separated by a second predetermined distance, which is the same length as the first predetermined distance, toward the second cavity reference cross section from the bending point;

generating, from the extraction information, a model of the electrical wire;

determining, from the model of the electrical wire, the location of passing points where the electrical wire passes through each cross section of the first cavity reference cross section, the first node reference cross section, the second node reference cross section, and the second cavity reference cross section;

calculating a length of a first section of the electrical wire, the first section extending from the first cavity reference cross section to the first node reference cross section, based on position coordinates of a first passing point where the electrical wire passes through the first cavity reference cross section and position coordinates of a second passing point where the electrical wire passes through the first node reference cross section, calculating a length of a second section of the electrical wire, the second section extending from the first node reference cross section to the second node reference cross section, based on the position coordinates of the second passing point where the electrical wire passes through the first node reference cross section, position coordinates of a third passing point where the electrical wire passes through the second node reference cross section and a bending angle of the electrical wire at the bending point, calculating a length of a third section of the electrical wire, the third section extending from the second node reference cross section to the second cavity reference cross section, based on the position coordinates of the third passing point where the electrical wire passes through the second node reference cross section and position coordinates of a fourth passing point where the electrical wire passes through the second cavity reference cross section; and outputting, as the wire length of the electrical wire, a sum of the section wire lengths in the respective sections.

2. The electrical wire length output method according to claim 1, wherein the method further comprises extracting, as additional extraction information, from the input information, a location of a first segment reference cross section, which is located between the first cavity reference cross section and the first node reference cross section, and is in parallel to the first cavity reference cross section and the first node reference cross section, and a location of a second segment reference cross section, which is located between the second cavity reference cross section and the second node reference cross section, and is in parallel to the second cavity reference cross section and the section node reference cross section, wherein a density of passing points passing through the first segment reference cross section occupied per unit area is larger than a density of passing points passing through the first segment reference cross section occupied per unit area and a density of passing points passing through the second segment reference cross section occupied per unit area is larger than a density of passing points passing through the second segment reference cross section occupied per unit area, determining, from the model of the electrical wire, the location of a passing point where the electrical wire passes through each cross section of the first and second segment reference cross sections, calculating a length of a fourth section of the electrical wire, the fourth section extending from the first cavity reference cross section to the first segment reference cross section, based on the position coordinates of the first passing point and position coordinates of a fifth passing point where the electrical wire passes through the first segment reference cross section, calculating a length of a fifth section of the electrical wire, the fifth section extending from the first segment reference cross section to the first node reference cross section, based on the position coordinates of the fifth passing point and the position coordinates of a second passing point where the electrical wire passes through the second segment reference cross section, calculating a length of a sixth section of the electrical wire, the sixth section extending from the second node reference cross section to the second segment reference cross section based on the position coordinates of the third passing point and the position coordinates of the sixth passing point, and calculating a length of a seventh section of the electrical wire, the seventh length extending from the second segment reference cross section to the second cavity reference cross section, based on the position coordinates of the sixth passing point and the position coordinates of the fourth passing point.

3. The electrical wire length output method according to claim 2, wherein the method further comprises determining, from the model of the electrical wire, the location of the second passing point or the fifth passing point by projecting a reduction of a distribution of the first passing point on the first cavity reference cross section onto the first node reference cross section or the first segment reference cross section, and determining the location of the third passing point or the sixth passing point by projecting a reduction of a distribution of the fourth passing point on the second cavity reference cross section onto the second node reference cross section or the second segment reference cross section.

4. A non-transitory computer readable storage medium in which an electrical wire length output program is stored for causing a computer to execute each step of the electrical wire length output method according to claim 1.

* * * * *